Figure 1:
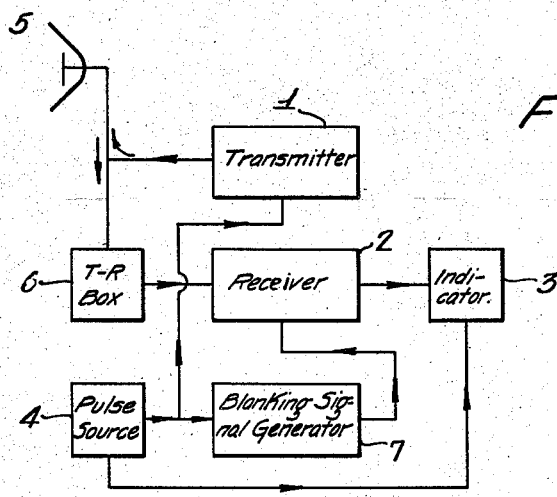

Sept. 16, 1947.  C. E. DOLBERG ET AL  2,427,523

BLANKING CIRCUIT

Filed Nov. 6, 1943

Inventors:
Charles E. Dolberg
Richard G. Clapp
by their Attorneys
Howson & Howson Patented Sept. 16, 1947

2,427,523

UNITED STATES PATENT OFFICE 2,427,523

BLANKING CIRCUIT

Charles E. Dolberg, Philadelphia, and Richard G. Clapp, Haverford, Pa., assignors, by mesne assignments, to Philco Corporation, Philadelphia, Pa., a corporation of Pennsylvania Application November 6, 1943, Serial No. 509,286

2 Claims. (Cl. 250—1.66)

This invention relates to a novel blanking circuit, and more particularly to a blanking signal generating and utilizing system suitable for use in radio detecting and ranging equipment (radar) to desensitize the pulse receiving circuits, not only during the transmission of the pulse, but also for a predetermined time interval subsequent thereto.

In radar systems it is customary to transmit time-spaced pulses in the form of a series of high frequency pulse signals (interrupted continuous waves), and to receive the same pulses upon reflection from distant objects. Means are provided at the radar station for measuring and indicating the elapsed time between the transmission of a pulse and the reception, upon reflection, of the same pulse. With such systems it is frequently desirable to desensitize, or blank, the receiver during the transmission of each pulse, so that the receiver, and particularly the associated indicating circuits, will not be overloaded by the direct reception of the transmitted pulse signals. It has been found, however, that under certain conditions it is not sufficient merely to blank the receiver only during the brief pulse transmission periods. It has been found that the high intensity transmitted pulse often produces a strong transient in certain of the receiving circuits, and that these persist for an appreciable time after the termination of the pulse. In addition it has been found that pulses reflected from nearby objects, such as parts of the antenna housing, nearby structures, and the like, may produce undesirably strong signals in the receiver and consequently undesirably strong indications on the indicating means. In long-range radar systems this latter effect is not regarded as serious, since the objects sought after are at a very considerable distance from the radar station compared to that of the interfering nearby structures. However, in short-range radar systems these short term reflections may be objectionable and in such instances it is desirable that means be provided for minimizing their effects upon the receiver and indicating means.

It is therefore a primary object of this invention to provide means for desensitizing, or blanking, a radar receiver not only during the transmission of the pulse signal, but also for a predetermined interval thereafter.

It is a further object of the invention to provide a blanking signal which desensitizes the receiver during the transmission of the main pulse, and which thereafter gradually restores the receiver's normal sensitivity over a predetermined period of time such that signals reflected from nearby objects and structures are greatly attenuated, while still producing indications of moderate magnitude in the indicating means.

Other objects and features of the invention will become apparent hereinafter.

Figure 2:
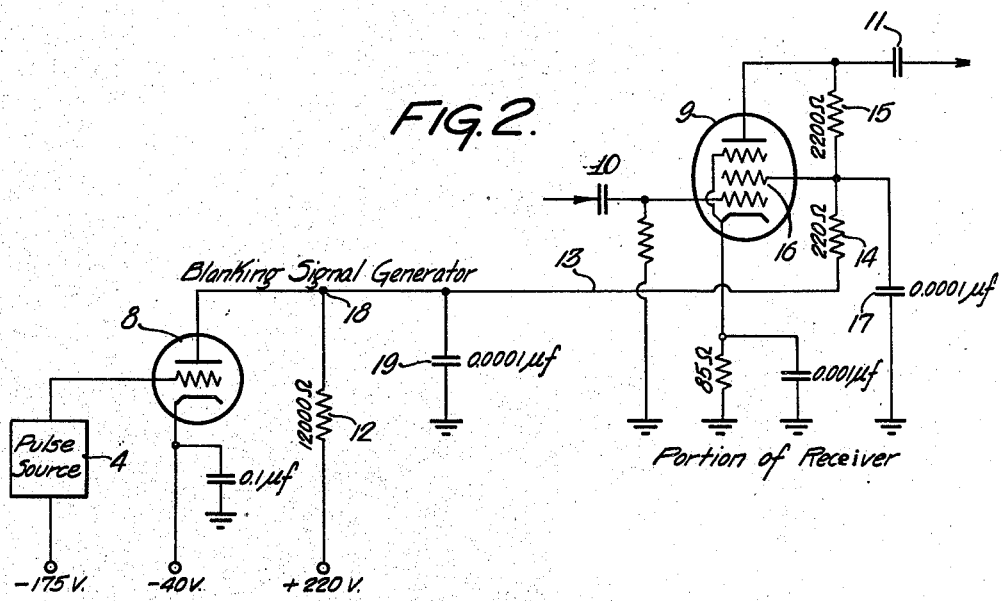
Figure 3:
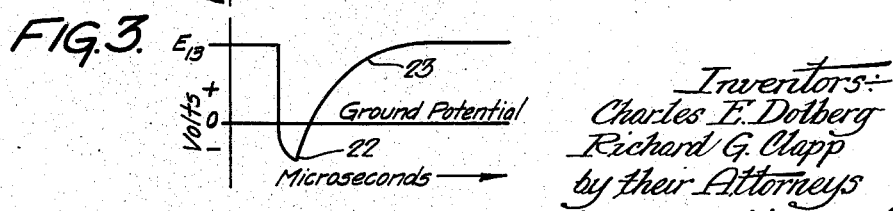

The invention itself will best be understood by reference to the following drawings, in which Fig. 1 is a block diagram of a typical radar system;

Fig. 2 is a schematic diagram of the blanking signal generator and circuit comprising the present invention; and Fig. 3 is a diagram used in explaining the operation of the circuit of Fig. 2.

It is believed that the invention will best be understood, if its description is preceded by a general description of a conventional radar system, such as that illustrated in the simplified block diagram of Fig. 1. As is well understood by those skilled in the art the basic elements of such a system comprise a pulse transmitter 1, a pulse receiver 2, and a suitable device 3 for indicating the elapsed time between the transmission of a given pulse and the reception of the same pulse. The indicating means 3 may comprise an oscilloscope with its associated control and operating circuits. The operation of the transmitter may be controlled by a switching signal from the pulse source 4. In a typical radar system the transmitter 1 and pulse source 4 combine to produce an interrupted constant wave signal comprising, for example, pulses of one microsecond duration occurring at the rate of 1000 per second. These signals may be radiated from a suitable antenna structure 5. Upon reflection from a distant object the returning pulses are received by the same antenna structure and supplied through the agency of the T-R box 6, to the receiver 2. The T-R (transmit-receive) box 6 is a device whose function it is to decouple the receiver 2 from the antenna 5 during the pulse transmission periods, and to decouple the transmitter 1 from the said antenna during the intervening periods. Such device is known in the art, and since it is not a part of the present invention it is deemed unnecessary to describe it in detail.

The indicating means 3 is responsive both to the modulating pulse (from the source 4) and to the reflected pulse (which it derives from the receiver 2), and is constructed and arranged, in known manner, to provide a reading or indication by means of which an observer is enabled to determine the distance of the reflecting object, the time interval between the transmission of the pulse and the reception of the reflected pulse being proportional, of course, to the distance between the radar system and the reflecting object.

While the T-R box 6 is effective to a considerable degree to decouple the receiver 2 from the antenna 5 during the pulse transmission period, it does not entirely prevent the receiver and indicator from being deleteriously affected by transmitted signal energy, and consequently it is customary to provide additional means for rendering the receiver insensitive to the transmitted signal. This is commonly accomplished by a blanking signal circuit.

In the system of Fig. 1, signal is derived from the pulse source 4 and supplied to a blanking signal generator 7 which generates a signal of suitable polarity and amplitude and applies it to selected gain controlling elements of the receiver 2. By means of this procedure, the receiver may be thoroughly desensitized during the pulse transmission period. As has already been indicated, however, this procedure is not entirely satisfactory in short-range radar systems, for the reason that the receiver is deleteriously affected by transients produced by the transmitted pulse, and also by powerful signals reflected from structures associated with the radar station, or from nearby objects such as aircraft and the like.

According to the present invention there is provided an improved blanking signal generator and circuit which is constructed and arranged to desensitize the receiver not only during the transmission of the main pulse, but also for a predetermined time thereafter, the said time being sufficient to protect the receiver against transients. The device of the invention is further constructed and arranged to restore the normal gain of the receiver gradually whereby to prevent receiver overloading due to the reception of strong reflected pulses received from nearby structures. An embodiment of the invention is illustrated in the schematic diagram of Fig. 2. In this figure the pulse source 4 corresponds to the similarly designated pulse source of Fig. 1, while the triode 8 and its associated circuits comprise the blanking signal generator 7 of Fig. 1. The pentode amplifier 9 is representative of a portion, preferably the intermediate frequency amplifier portion, of the receiver 2 of Fig. 1. Signal from a preceding portion of the receiver may be supplied to the amplifier 9 through a suitable coupling condenser 10, and, after amplification, may be supplied to subsequent portions of the receiver by way of a coupling condenser 11. Plate and screen potentials are supplied to the amplifier 9 from a source designated +220 v. The screen circuit includes the resistor 12, the conductor 13, and the resistor 14, while the plate circuit includes these elements together with the plate load resistor 15. The screen grid 16 is grounded at the operating intermediate frequency by the condenser 17.

In the intervals between the pulses the triode 8 is biased below plate current cutoff, so that the potential applied to the screen and plate electrodes of the amplifier 9 is less than the voltage of the source (in this case 220 volts) only by the relatively small voltage drops in the resistors 12, 14 and 15. In the embodiment of Fig. 2 the effective bias on the triode 8 is given by the difference between the cathode and grid voltages, in the case illustrated, —135 volts. During the pulse interval a square signal pulse is derived from the pulse source 4 of sufficient amplitude to drive the triode substantially to plate current saturation. In this condition the plate impedance of the triode forms, with the resistor 12, a voltage divider across the plate and bias potential sources designated, in Fig. 2, —40 v. and +220 v. Preferably the triode 8 has a plate impedance, in the saturated condition, which is low compared with the resistance of the plate load resistor 12, so that during the pulse the point 18 (the junction of the triode's plate and its load resistor 12) drops somewhat below ground potential. Since the point 18 is the effective source of screen and plate potential for the amplifier 9 it follows that during the pulse period the screen and plate potentials drop from their normal positive value to a value which may be below ground potential.

In the absence of the condensers 17 and 19, the plate and screen voltages of the IF amplifier 9 would be at low or negative potential only in the presence of the pulse signal, and in consequence the IF amplifier would be blanked only during that period.

In accordance with one of the features of the invention, sufficient capacitance is connected between a low potential point (e. g., ground) and the plate of triode 8 substantially to lengthen the blanking interval and thereby to desensitize the receiver not only during the period in which the pulse is transmitted, but also during the period immediately following. Such capacitance may be provided by the already present screen bypass condenser 17, and, if desired, by the additional condenser 19 connected from the point 18 to ground. While these condensers are physically separated by the small screen filter resistor 14, this has no substantial electrical effect upon the blanking system illustrated. The effect of these condensers can best be described with reference to Fig. 3, in which the graph 20 represents the signal derived from the pulse source 4 plotted against time in microseconds. The pulse 21 may have a duration of the order of 1 microsecond, and its amplitude may be sufficient, when applied to the grid of the triode 8, to drive the tube to plate current saturation. In the intervals between pulses the condensers 17 and 19 are each charged, from the source +220 v., to the normal operating screen potential of the tube 9 (ignoring the negligible voltage difference between the condensers produced by the resistor 14). This potential is indicated in the lower graph of Fig. 3 as $E_{13}$. With the arrival of the pulse 21 the triode 8 is driven to plate current saturation with the result that the upper plates of the condensers 17 and 19 are connected, through the low impedance triode path (which may be of the order of 500 ohms), to the source of voltage designated —40 v. Because the impedance of the saturated triode 8 is very low, the voltage on the condensers, and hence on the conductor 13, drops almost instantaneously, as indicated in Fig. 3, to a voltage which is preferably of the order of, or slightly below, ground potential. As the condenser voltage approaches very closely the voltage of the cathode of the triode 8 it falls less rapidly, finally reaching the voltage designated by the point 22 of Fig. 3 just as the pulse is terminated. At the conclusion of the pulse the triode 8 is again driven to a bias condition below plate current cutoff, and the condensers are recharged through the resistor 12, the potential of the conductor 13 returning to the normal voltage $E_{13}$ along a path 23, the shape of which is largely dependent upon the time constant of the circuit comprising the resistor 12 and the condensers 17 and 19.

In one satisfactory physical embodiment of the invention a time constant of 2.4 microseconds was employed. With a time constant of this magnitude the screen and plate electrodes of the amplifier 9 are returned to within the approximately 30% of their normal operating voltage within 2.4 microseconds. This condition is illustrated approximately in the graphs of Fig. 3. Under these circumstances the amplifier 9 is rendered inoperative for a substantial period following the pulse with the result that transients produced in the receiver by the reception of the pulse are rendered harmless. Aside from this, however, the invention provides the additional advantage that in the period following the pulse and the immediately following transient, the sensitivity of the amplifier is restored gradually, as indicated by the portion 23 of the graph of Fig. 3, so that pulse signals reflected from nearby structures, and which are consequently of considerable amplitude, are discriminated against by the amplifier 9 with the result that they emerge from the receiver 2 with substantially no more than normal signal amplitude.

In the schematic diagram of Fig. 2 the gain controlling voltage derived from the conductor 13 is applied, as hereinbefore described, to both the screen grid and plate of the amplifier 9. It will be evident, of course, that a lesser degree of gain control may be effected by applying this voltage to only one or the other of said electrodes. On the other hand, if it is desired to secure a greater gain control effect, it is entirely within the province of this invention to apply the gain controlling signal to the screen and plate electrodes (or to any combination thereof) of a plurality of amplifier tubes.

While the features of the present invention have been described with respect to specific embodiments, it will be understood that this is solely for the purpose of disclosure, and should not be taken as a limitation of the invention to the specific constructions illustrated. Moreover, although the embodiment illustrated in Fig. 2 has been described with particular reference to radar systems, it will be evident that the blanking circuit there disclosed is applicable in any instance where it may be desirable to blank or desensitize receivers during and shortly following the transmission of carrier wave signals.

We claim:

1. In a radio ranging system, a source of pulse signals, a transmitter, modulating means responsive to pulses from said source for effecting the generation of interrupted continuous waves, means for radiating said waves, a receiver adapted to receive echoes of wave energy initially transmitted from said transmitter, a signal utilization means connected to the output terminals of said receiver, an amplifier tube in said receiver having at least one gain controlling electrode, means responsive to said pulse signals and connected to said gain controlling electrode for blanking said receiver substantially simultaneously with the inception of each wave transmission period and throughout said period, and a capacitance connected between a point of substantially fixed potential and said gain controlling electrode for extending the blanking period substantially beyond the termination of said wave transmission period, and for restoring gradually the normal operating gain of said amplifier, whereby said signal utilization means is protected not only from the transmitted wave and from receiver transients produced by said wave, but also from excessively strong signals reflected from surfaces and structures situated at distances less than the intended minimum range of said system.

2. In a radio ranging system employing pulse signals of predetermined time duration, a receiver blanking circuit constructed and arranged to function in conjunction with an amplifier stage having a gain control electrode, comprising a source of periodic pulse signals, a triode controlled by said signals having a low direct-current plate resistance in the condition of plate-current saturation, a connection between the cathode of said triode and a point of low potential, a resistor connected between the plate of said triode and a point of high potential, a condenser connected between said plate and a point of low potential, the time constant of said resistor and condenser taken in combination being of the order of the time duration of said pulse signals, and a connection between said plate and the gain control electrode of said amplifier stage.

CHARLES E. DOLBERG.
RICHARD G. CLAPP.

REFERENCES CITED

The following references are of record in the file of this patent:

UNITED STATES PATENTS

| Number | Name | Date |
|---|---|---|
| 2,167,492 | Sproule | July 25, 1939 |
| 1,933,219 | Nakajima et al. | Oct. 31, 1933 |

FOREIGN PATENTS

| Number | Country | Date |
|---|---|---|
| 113,233 | Australia | June 2, 1941 |